US00RE42735E

(19) United States
(12) Reissued Patent
Bagwell et al.

(10) Patent Number: US RE42,735 E
(45) Date of Reissued Patent: Sep. 27, 2011

(54) METHOD AND APPARATUS FOR CONTROLLING SPACE CONDITIONING IN AN OCCUPIED SPACE

(75) Inventors: Rick Bagwell, Scottsville, KY (US); Andrey Livchak, Bowling Green, KY (US)

(73) Assignee: Oy Halton Group Ltd., Helsinki (FI)

(21) Appl. No.: 12/551,516

(22) Filed: Aug. 31, 2009

Related U.S. Patent Documents

Reissue of:
(64) Patent No.: 7,364,094
Issued: Apr. 29, 2008
Appl. No.: 11/210,550
Filed: Aug. 23, 2005

U.S. Applications:
(62) Division of application No. 10/638,754, filed on Aug. 11, 2003, now Pat. No. 7,147,168.

(60) Provisional application No. 60/402,398, filed on Aug. 9, 2002.

(51) Int. Cl.
*F24F 7/00* (2006.01)
*B08B 15/02* (2006.01)
*F24F 11/00* (2006.01)

(52) U.S. Cl. ..... 236/49.3; 454/67; 454/239

(58) Field of Classification Search ..... 236/49.1, 236/49.3; 62/157; 454/61, 67, 229, 239, 454/56, 256, 343
See application file for complete search history.

(56) References Cited

U.S. PATENT DOCUMENTS 4,285,390 A 8/1981 Fortune et al.
5,312,297 A 5/1994 Dieckert et al.
6,974,380 B2 12/2005 Cui et al.

OTHER PUBLICATIONS

Technician's guide to HVAC by Gary K Skimn, P.E., 1995, by McGraw-hill, pp. 323-330.

*Primary Examiner* — Chen-Wen Jiang
(74) *Attorney, Agent, or Firm* — Miles & Stockbridge P.C.; Mark A. Catan

(57) ABSTRACT

Techniques for controlling air conditioning and transfer air in an occupied space are described. The example of a commercial restaurant is provided. Features of model based control and integration of load predictors is also described.

2 Claims, 5 Drawing Sheets

METHOD AND APPARATUS FOR CONTROLLING SPACE CONDITIONING IN AN OCCUPIED SPACE

Matter enclosed in heavy brackets [ ] appears in the original patent but forms no part of this reissue specification; matter printed in italics indicates the additions made by reissue.

*CROSS REFERENCE TO RELATED APPLICATIONS*

*The present application is a divisional of U.S. application Ser. No. 10/638,754, filed Aug. 11, 2003, now U.S. Pat. No. 7,147,168, which claims the benefit of U.S. Provisional Application No. 60/402,398, filed Aug. 9, 2002, now expired.*

BACKGROUND

Space conditioning or heating, ventilating and air-conditioning (HVAC) systems are responsible for the consumption of vast amounts of energy. This is particularly true in food preparation/dining establishments where a large amount of conditioned air has to be exhausted from food preparation processes. Much of this energy can be saved through the use of sophisticated control systems that have been available for years. In large buildings, the cost of sophisticated control systems can be justified by the energy savings, but in smaller systems, the capital investment is harder to justify. One issue is that sophisticated controls are pricey and in smaller systems, the costs of sophisticated controls don't scale favorably leading to long payback periods for the cost of an incremental increase in quality. Thus, complex control systems are usually not economically justified in systems that do not consume a lot of energy. It happens that food preparation/dining establishments are heavy energy users, but because of the low rate of success of new restaurants, investors justify capital expenditures based on very short payback periods.

Less sophisticated control systems tend to use energy where and when it is not required. So they waste energy. But less sophisticated systems exact a further penalty in not providing adequate control, including discomfort, unhealthy air, and lost patronage and profits and other liabilities that may result. Better control systems minimize energy consumption and maintain ideal conditions by taking more information into account and using that information to better effect.

Among the high energy-consuming food preparation/dining establishments such as restaurants are other public eating establishments such as hotels, conference centers, and catering halls. Much of the energy in such establishments is wasted due to poor control and waste of otherwise recoverable energy. There are many publications discussing how to optimize the performance of HVAC systems of such food preparation/dining establishments. Proposals have included systems using traditional control techniques, such as proportional, integral, differential (PID) feedback loops for precise control of various air conditioning systems combined with proposals for saving energy by careful calculation of required exhaust rates, precise sizing of equipment, providing for transfer of air from zones where air is exhausted such as bathrooms and kitchens to help meet the ventilation requirements with less make-up air, and various specific tactics for recovering otherwise lost energy through energy recovery devices and systems.

Although there has been considerable discussion of these energy conservation methods in the literature, they have had only incremental impact on prevailing practices due to the relatively long payback for their implementation. Most installed systems are well behind the state of the art.

There are other barriers to the widespread adoption of improved control strategies in addition to the scale economies that disfavor smaller systems. For example, there is an understandable skepticism about paying for something when the benefits cannot be clearly measured. For example, how does a purchaser of a brand new building with an expensive energy system know what the energy savings are? To what benchmark does one compare the performance? The benefits are not often tangible or perhaps even certain. What about the problem of a system's complexity interfering with a building operator's sense of control? A highly automated system can give users the sense that they cannot or do not know how to make adjustments appropriately. There may also be the risk, in complex control systems, of unintended goal states being reached due to software errors. Certainly, there is a perennial need to reduce the costs and improve performance of control systems. The embodiments described below present solutions to these and other problems relating to HVAC systems, particularly in the area of commercial kitchen ventilation.

DETAILED DESCRIPTION OF THE EMBODIMENTS

Figure 1:
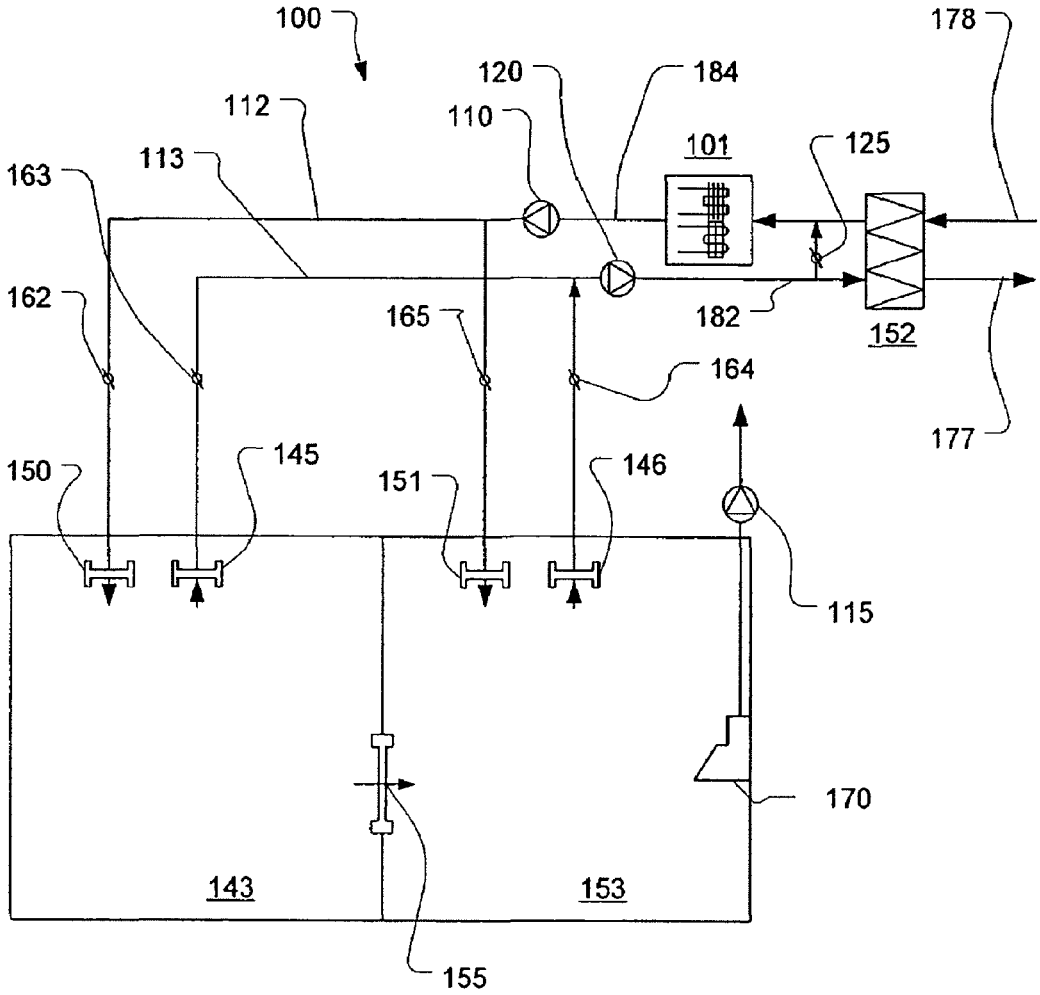
FIG. 1 is a schematic of an HVAC system and building served by it.

Referring to FIG. 1, occupied 143 and production 153 spaces are served by an HVAC system 100. The production space 153 may be one or multiple spaces and include, for example, one or more kitchens. The occupied space 143 may be one or many and may include, for example, one ore more dining rooms. The system 100 draws return air through return registers 145 and 146 respective to the occupied 143 and production 153 spaces.

The return registers 145, 146 are in communication with return lines that join and feed a common return line 182 through which air is drawn by a fan 120. The common return line 182 leads to an air/air heat exchanger 152, which transfers heat (and in some types of air/air heat exchangers, moisture as well as heat) from the outgoing exhaust flow in the common return line 182 to an incoming fresh air flow 178. A recirculating flow of air is modulated by a return air (RA) damper 125.

Fresh air, preconditioned by flow through the air/air heat exchanger 152, and drawn by a fan 110, is mixed with return air from the return air damper 125 and conditioned by conditioning equipment 101, which may include cooling, heating, dehumidification, filtration and/or other equipment (not shown separately). The supply and return air flow rates may be regulated by respective dampers 162, 163, 164, and 165 to exchange air at selected rates to the respective occupied and production spaces 143 and 153. The supply and return air streams pass through respective supply 150, 151 and return 145, 146 air registers. As will be understood by those skilled in the art, the dampers 162, 163, 164, and 165 may be integrated in a modular variable air volume (VAV) "box." Also, the dampers 162, 163, 164, and 165 may be linked mechanically or the return dampers omitted (as illustrated in the embodiment of FIG. 2).

A flow is drawn through a local exhaust device by a fan 115 from a hood or other intake in the production space 153 and discharges to the atmosphere. The exhaust 170 may be provided by a range hood such as a backshelf or canopy style hood and the illustrated exhaust device 170 may be one or many, although only one is illustrated. A transfer air vent or other opening 155 such as a window allows transfer air through a transfer air connection between the occupied and production spaces 143 and 153.

The supply dampers 162 and 163 may be used to move air from the occupied space 143 to the production space 153 to compensate for exhaust from the production space 153. Although the spaces 143 and 153 are shown adjacent, they may be separate and air transfer accomplished by ducting. Also, any number of spaces may be in the systems of FIGS. 1 and 2, and two spaces 143 and 153 are shown only for purposes of illustration. Note that air may be brought into the occupied 143 or production 153 spaces actively or passively. For example a vent may be provided in the wall of the production space 153 (as illustrated in FIG. 2) or by a makeup air unit or system (also illustrated in FIG. 2).

Figure 2:
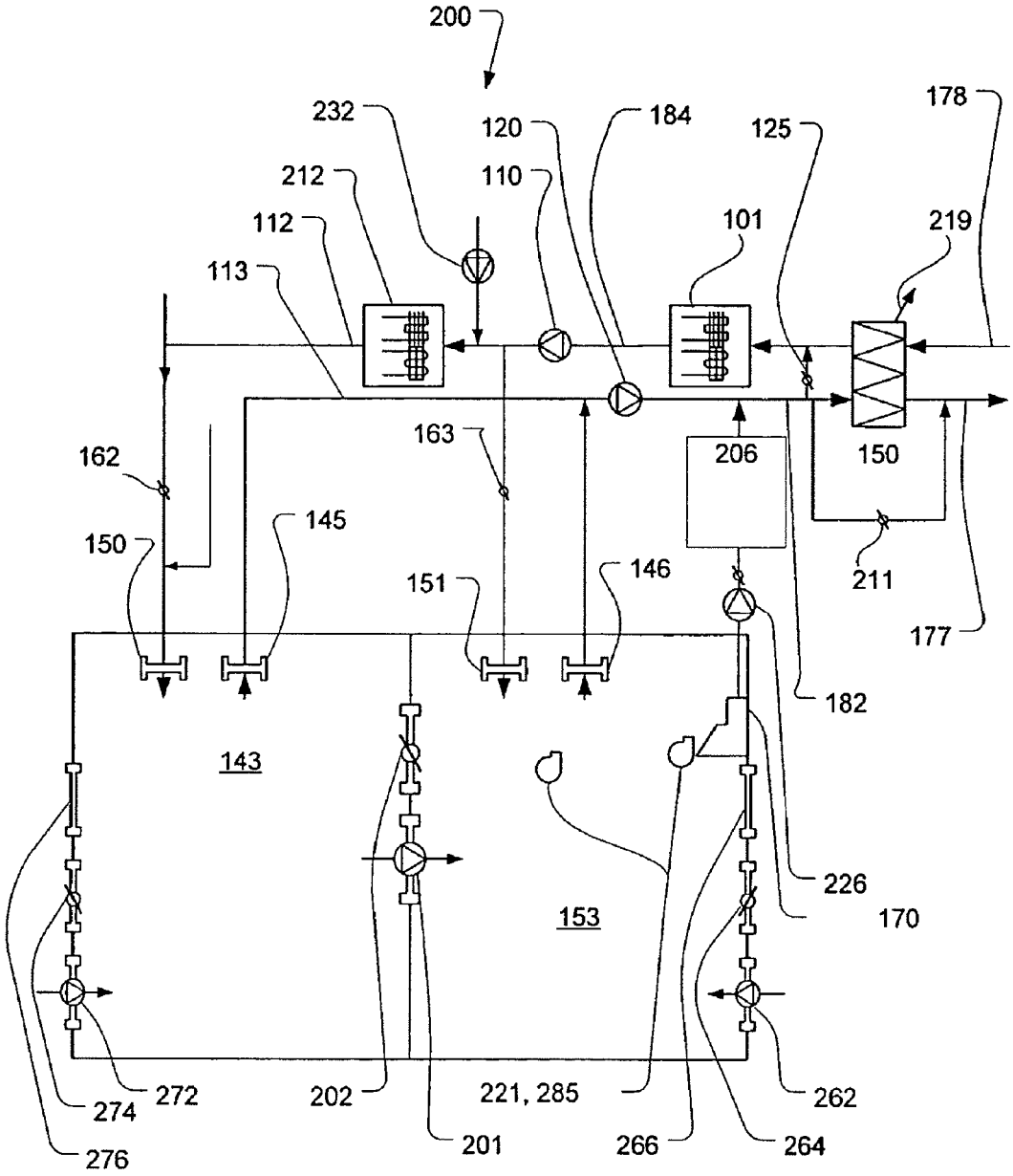
FIG. 2 is a schematic of an HVAC system and building served by it showing some alternative variations on the configuration of FIG. 1.

Another embodiment of a space conditioning system is illustrated in FIG. 2. The features of this embodiment may be incorporated in the embodiment of FIG. 1 separately or in concert. Instead of regulating the flow of transfer air through a passive transfer air connection 155, as in FIG. 1, exhaust flow may be balanced by regulating return line dampers 163 and 164 (see FIG. 1).

The transfer air exchange rate may be regulated by means of a variable fan 201 or a damper 202. It is assumed, although not shown and as known in the art, that variable flows may be regulated with feedback control so that the final control signal need not be relied upon to determine the effect of a flow control signal. Thus, it should be understood that all variable devices may also include feedback sensors such as pitot tube/pressure sensor combinations, flowmeters, etc. as part of the final control mechanism. An air/air heat exchanger bypass and damper combination 211 may be provided to permit non-recirculated air to bypass the air/air heat exchanger 150. The conditioning equipment 101 may be accompanied by another piece of conditioning equipment 212 in the leg of the supply lines 112 leading to the occupied space 140 so that conditioning of the two supply air streams may be performed by respective units 101 and 212 satisfying different criteria for the spaces they serve. Note that the fans shown, such as 110 and 120 in both FIGS. 1 and 2 may be incorporated within a rooftop unit that combines them with the conditioning equipment 101 and 212. Additional make-up air may be supplied by a separate fan and intake 232.

The local exhaust 206 may be fed to the air/air heat exchanger 152 as well, but preferably, if the local exhaust contains a large quantity of fouling contamination, the stream should be cleaned by a cleaner 206 before being passed through the air/air heat exchanger 150. For example, the production space 153 could be a kitchen and the exhaust 170 a hood for a range. Then the cleaner 206 may be a catalytic converter or grease filter.

Separate routes for convection, either forced or natural, and either controlled or uncontrolled may exist either by design or fortuity. These are represented symbolically by make-up air units 272 and 262, vents with dampers 274 and 264, and uncontrolled vents 276 and 266. The make-up air units 272 and 262, vents with dampers 274 and 264 may be controlled by a control system (See 300 at FIGS. 3 and attending discussion). Uncontrolled vents 276 and 266 can represent open windows, doors, and leaks.

Figure 3:
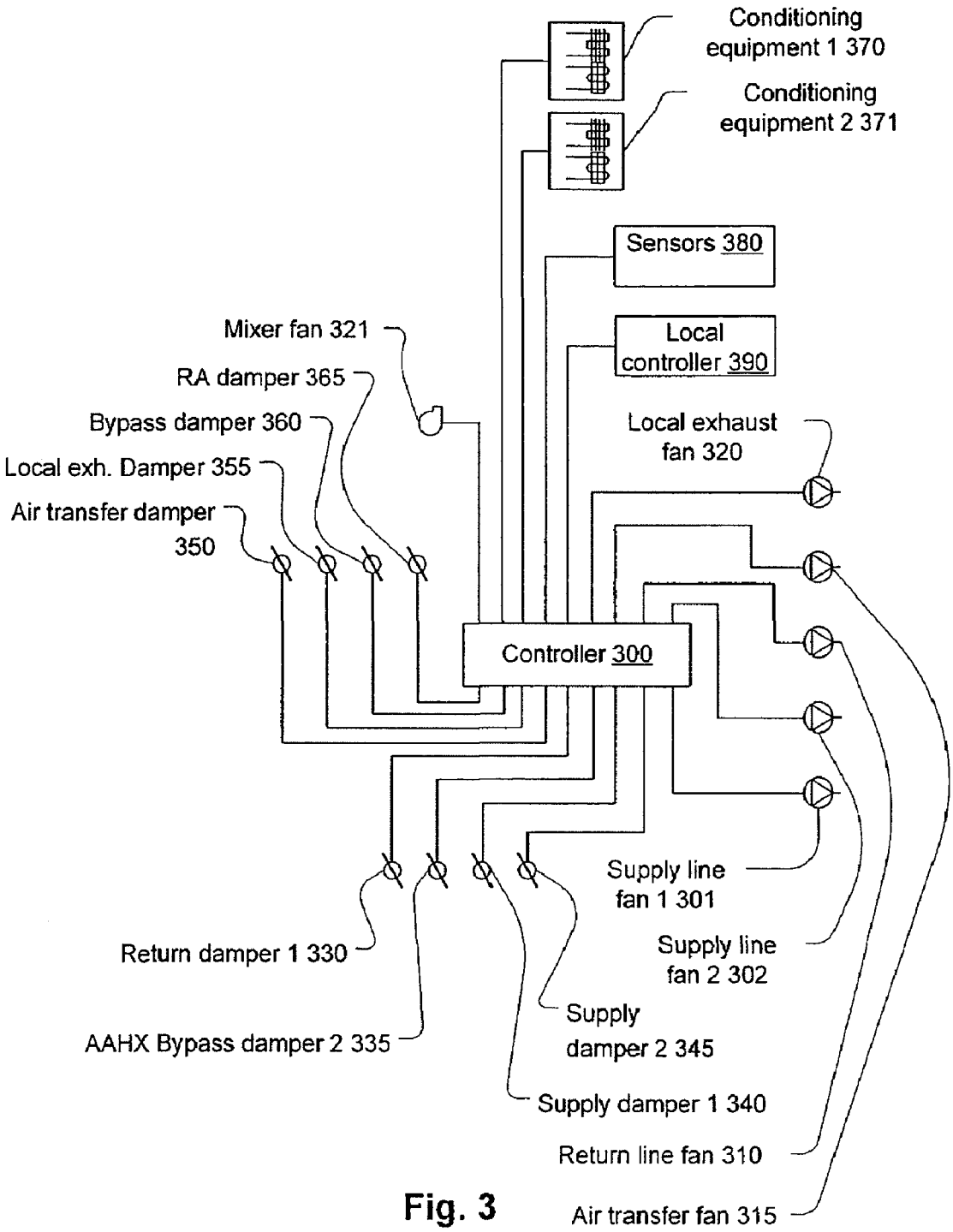
FIG. 3 is a schematic of a control system for the HVAC systems of FIGS. 1 and/or 2 or others.

Referring now to FIG. 3, a control system for either HVAC system 100 or 200 (FIGS. 1 and 2, respectively) or a combination of features (or subset of features), thereof, is shown. A controller 300 controls conditioning equipment 370 and 371, which may correspond to conditioning equipment 101 or both 101 and 212 if used in combination or any other combination of like equipment. Preferably the controller is a programmable microprocessor controller. The controller 300 may also control variable flow fans and/or fixed speed fans such as a return line fan 310, air transfer fan 315, local exhaust fan 320, and first and second or other supply line fans 301 and 302, respectively. The controller may also control dampers (or other like flow controls) such as a return damper 330, air/air heat exchanger bypass damper 335, first and second supply dampers 340 and 345, and/or other instances. The controller 300 may also control a mixer fan 321 and/or other devices which may correspond to mixing fans 221 and 285 or others. Various feedback sensors 380 may send input signals to the controller 300. Also, the controller 300 may control a subsystem controlled by some other control process 390 either that is separate or integrated within the controller 300. For example, the local exhaust 170 may be controlled by a control process that regulates exhaust flow based on the rate of fume generation.

Inputs to the controller may include:

- Cooking or fume load rate or exhaust flow rate, which may be controlled directly or locally by a local processor or by a control process integrated within the controller.
- Local exhaust flow rate or inputs to a control process for controlling local exhaust flow rate.
- Production space temperature, air quality, or other surrogate for determining the cooling load for the production space. For example, the cooling load could be determined by thermostat, the activity level detected by video monitoring, noise levels. If the production space is a kitchen, the load may be correlated to the occupancy of the dining room which could indicate the number of dishes being prepared, for example as indicated by a restaurant management system that can be used to total the number of patrons currently seated in the dining area (occupied space). The latter may also be used to indicate the occupied space load.
- Pressure of the spaces relative to each other to determine transfer air. The transfer air damper or fan may be used to regulate the flowrate to ensure air velocities in the production space do not disrupt exhaust plumes thereby reducing capture efficiency.
- Flows of supply air which may indicate loads if these are slaved to a VAV control process integrated within controller 300 or governed by an external controller.
- Time of day keyed to kitchen operation mode (prep. mode, after hours cleaning, not occupied, etc.)
- Direct detection of air quality such as smoke detection, air quality (e.g., contamination sensor), etc.

Preferably, the controller 300 has the capability of performing global optimization based on an accurate internal system model. Rather than relying on feedback, for example, a change in temperature of the occupied space resulting from a fixed-rate increase in air flow to the occupied space, the effect on air quality (e.g. temperature, humidity, etc.) may be predicted and the increase in flow modulated. For example, the system may predict an imminent increase in load due to the arrival of occupants and get a head start. The internal representation of the state of the occupied spaces, equipment, and other variables that define the model (although definitions of the interactions between these variables are also considered part of the model) may be corrected by regular reference to the system inputs such as sensors 380.

Figure 4:
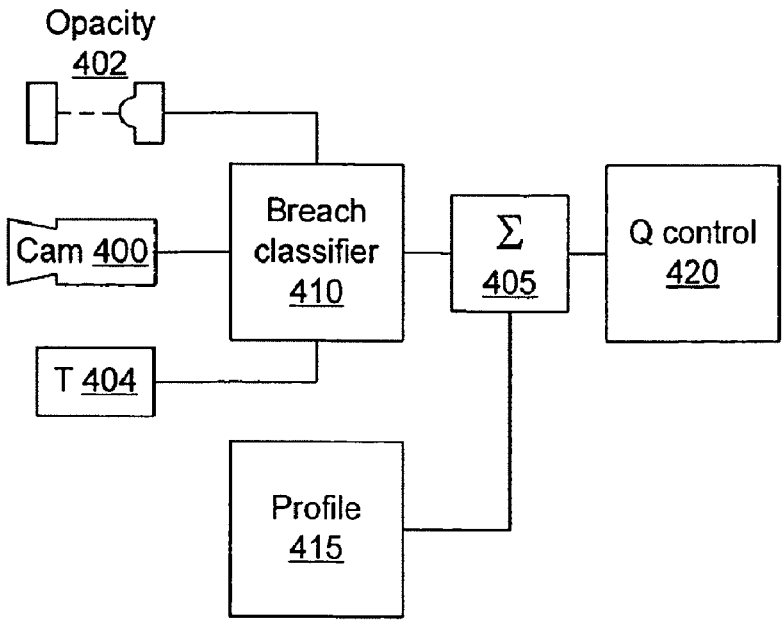
FIG. 4 is a block diagram illustrating in functional terms a control method for controlling exhaust flow according to an embodiment of the invention.

The local exhaust 170 may be permitted to allow some escape of effluent. Referring to FIG. 4, a signals from detector of smoke or heat escaping the pull of an exhaust hood (not shown) are classified as a breach of a portion of the controller 300 (FIG. 3). The detector or detectors may include an opacity sensor 402, a temperature sensor 404, video camera 400, chemical sensors, smoke detectors, fuel flow rate, or other indicators of the fume load. These and others are described in pending U.S. patent application Ser. No. 10/344,505 entitled Flow Balancing System and Method which is a US National stage filing from PCT/US01/25063, which is hereby incorporated by reference as if fully set forth in its entirety herein.

The direct sensor signal may be applied to a suitable classifier 410 according to type of signal and appropriate processing performed to generate an indication of a breach. For example, the classifier 410 for opacity or temperature may simply output an indication of a breach when the direct signal goes above a certain level. This level may be established by preferences stored in a profile 415, which may be a memory portion of the controller 300. To classify a breach, a direct video signal must be processed quite a lot further. Many techniques for the recognition of still and moving patterns may be used to generate a breach signal.

An indication of a breach may be integrated using a suitable filter 405 to generate a result that is applied to a volume controller for the exhaust 420. The result from the filter process may be selectably sensitive by selecting a suitable filter function, for example an integrator. In this manner, the controller 300 may be made configured to allow a selective degree of breach before correcting it by controlling the exhaust fan 320 or exhaust damper 355 (FIG. 3) by means of the appropriate control action, here represented by the volume controller 420. Note that the filter 405 is shown as a separate device for illustration purposes and may be integrated in software of the controller 300. Also, its result may be a rule-based determination made controller 300 software or accomplished by various other means, a filter function being discussed merely as an illustrative example.

As mentioned above, a mixing fan 221 may be used to mix the effluent with ambient air to help dilute its concentration. This mixing fan 221 may also be under control of a central control system. The mixing fan should be configured so as not to disrupt any rising thermal plume near an exhaust hood which may be accomplished by ensuring it is a low velocity device and is suitably located.

Preferably the rate of transfer air is governed such that energy requirements are minimal while the air quality remains at an acceptable level. Thus, at times when air is exhausted at a high rate from the production space 150, large amounts of replacement air are necessarily brought in to replace it. At such times, it may be permissible to allow a large volume of (used; contaminated) transfer air from the occupied space, which, when diluted by the large volume of fresh air results in acceptable air quality in the production space 150.

Again, the flow velocities resulting from transfer air movement from the occupied 153 to the production space 143 may be limited by active control to prevent disruption of exhaust capture. However, the upper limit on the transfer air velocity may be made a function of the type of processes being performed (products of which are exhausted), the exhaust rate, the activity level in the production space, etc. The reason for this is that local velocity variations may already be above a certain level, for example due to a high level of activity in the production space 143, such that the exhaust rate must be made high to ensure capture. In that case, a low cap on the transfer rate would waste an opportunity to provide make-up air from a "free" source. Thus, when the exhaust rate is increased already due to some other condition, such as transient air velocities near the exhaust hood stirred up by worker movements, the transfer air may be increased. Alternatively or in addition, to allow the transfer of great quantities of air without interfering with hood capture, transfer air may be distributed by low velocity distribution systems such as used in displacement ventilation or under-floor distribution.

Figure 5:
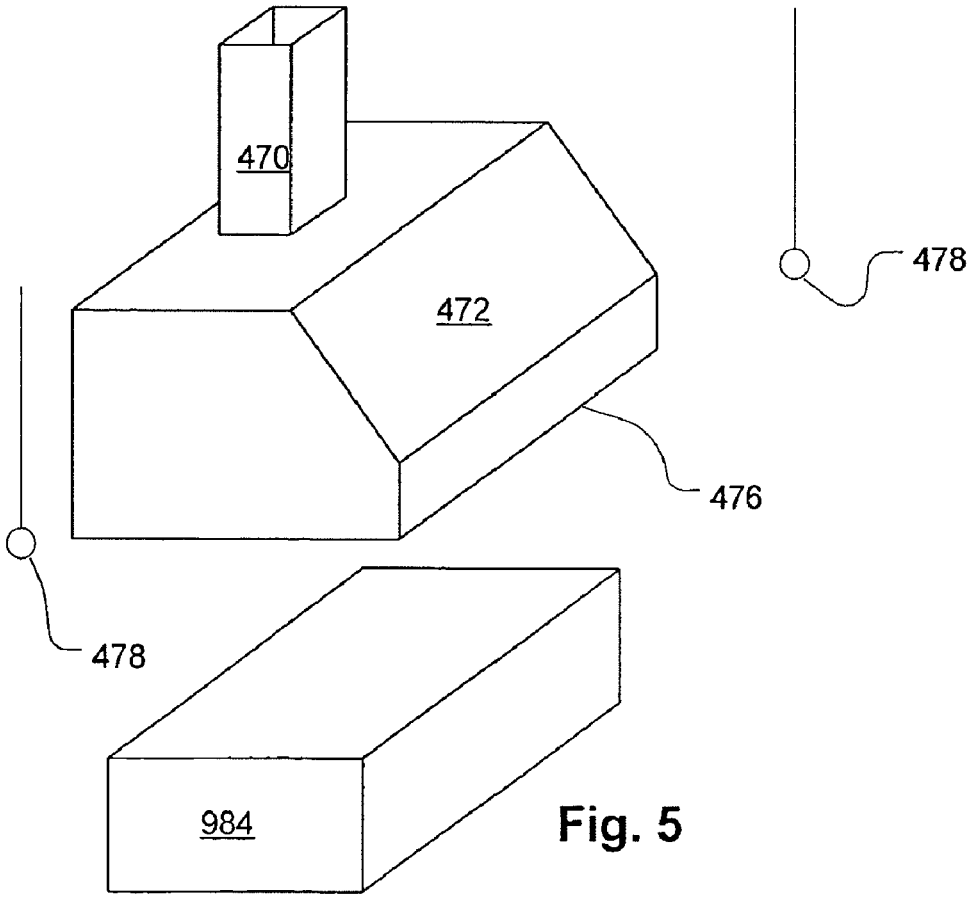
FIG. 5 illustrates a configuration for measuring transient velocities near and around an exhaust hood.

Referring momentarily to FIG. 5, velocity sensors may be located near the hood, for example hanging from a ceiling, to measure transient velocities. If such velocities exceed a predefined magnitude, for example based on average, root mean square (RMS), or peak values, an alarm may be generated. At the same time, the problem may be compensated until addressed by increasing exhaust flow. Various convolution kernels or other filter functions may be applied to account for occasional spikes due to escape and thereby account for their undesirability appropriately.

The transfer air should also be controlled so that when outside air is at moderate temperatures, it is low so that the cleanest possible air can be provided to the production space. This may be accomplished using, for example, the simple economizer control approach described in the background section, which the controller 300 may be configured to provide, or more sophisticated approaches.

The local exhaust flow (e.g., via fan 32) may be controlled to allow occasional escape of effluent from the hood. This has a result that is analogous to transferring used air from the occupied space in that if sufficiently diluted, the escaping effluent does not cause the production space air quality to fall below acceptable levels.

One simple control technique is to slave the transfer flow to the make-up air flow, which may be a combination of ventilation air satisfied using a standard VAV approach such as ventilation reset plus supplemental air intake 232. This may be performed by the controller using known numerical techniques. A more sophisticated model based approach may also be used as discussed below.

Model based approaches that may be used include a process that varies inputs to a model using a brute-force algorithm, such as a functional minimizing algorithm designed for complex nonlinear models, to search-for and find global optima on a real-time basis. A simplified smoothed-out state-function can be derived by simulation with a model based on the particular design of the system and used with a simpler optimization algorithm for real-time control. The model may be adequate with multiple decoupled components by which control may be performed by independent threads or by means of different controllers altogether. A network model, for example a neural network, may be trained using a simulation model based on the particular design of the system and the network model used for predicting the system states based on current conditions.

The desired temperature of the production space 150 may be varied depending on various factors. For example, in a restaurant, during periods of high activity such as during busy meal periods such as lunchtime or dinner time, the target temperature of the kitchen (production space) may be lowered to save energy in the winter. This may be done by controlling according to time. It may also be done by detecting load or activity level.

The air/air heat exchanger bypass preferably bypasses exhaust flow when tempering would not save substantial energy. For example, if outdoor temperatures are moderate, the bypass may be activated to save fan power. The threshold temperature governing this control feature may be varied depending on the target temperature, which as mentioned, may be varied.

Figure 6:
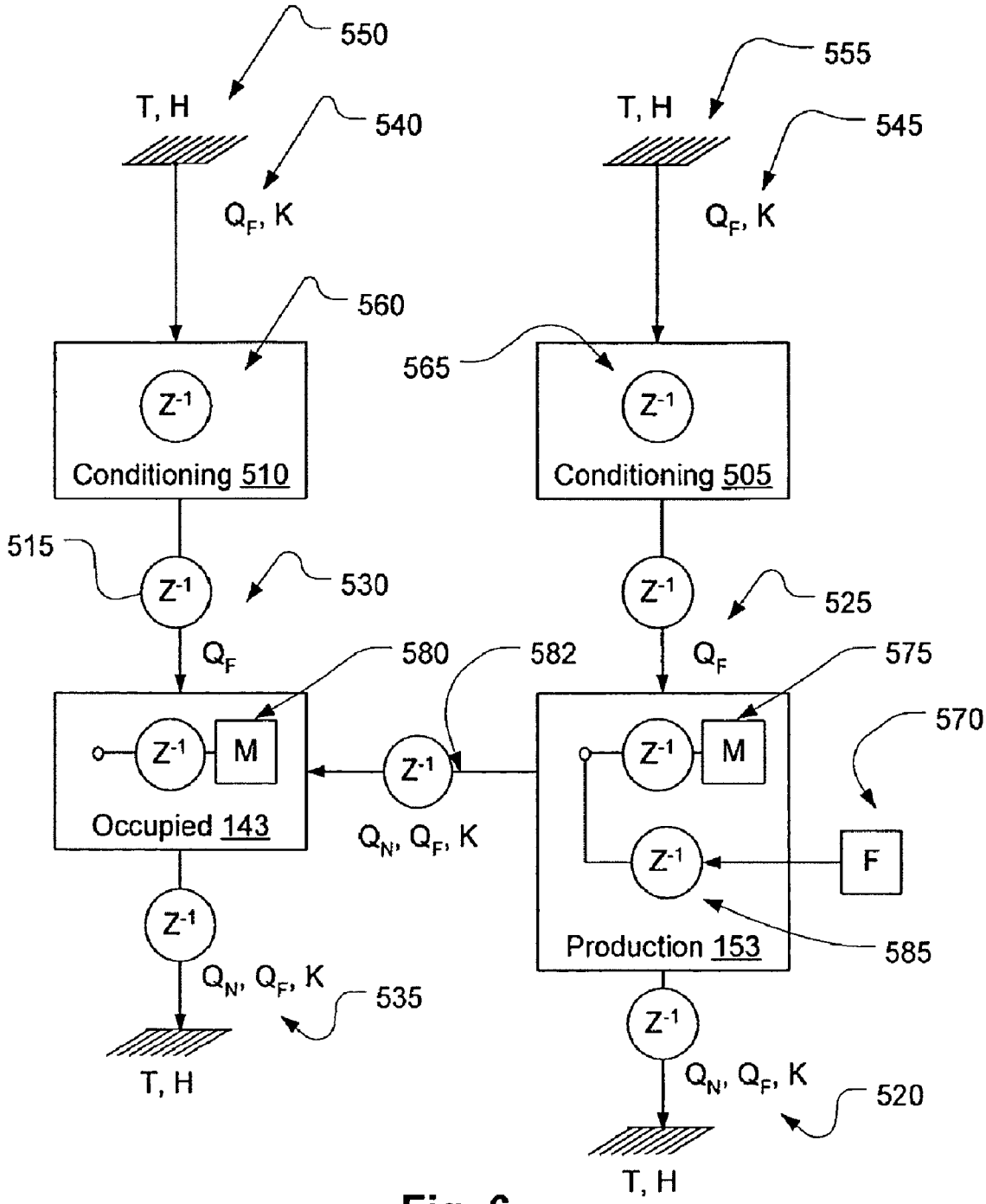
FIG. 6 illustrates delays and interactions that may be incorporated in a control model of feed forward control system.

Referring now to FIG. 6, as indicated above, a global predictive control scheme may be employed to compensate for interaction between conventional control loops and time lags between conventionally measured system responses and control actions. In the diagram of FIG. 6, delays are illustrated by the delay operator symbol used in discrete time texts as shown at 515, for example. Infinite enthalpy sources and sinks are illustrated by the electrical symbol for "ground" as shown at 550, 555, 535 and 520. Respective space conditioning systems are illustrated, which is common in kitchen-dining room environments. For example, a separate rooftop unit 510 and 505 may be provided for each of several zones, here, a production zone 153 and an occupied zone 153 which could be a kitchen and dining room respectively.

Over time, enthalpy is transferred by forced convection and conduction processes, illustrated at 545 and 540, respectively, to a heat exchanger (not shown) to vapor compression equipment with the conditioning units (e.g. rooftop unit) 505 and 510. When conditioning units 505 and 510 are forced air units, they satisfy cooling and heating loads by means of forced convection illustrated at 525 and 530, respectively. Within each space 153 and 143, enthalpy is transferred to objects that can store it such as thermal mass, as well as objects that can originate load such as occupants here illustrated as blocks 575 and 580. In the production space fuel 570 may be consume adding to the load. Direct losses may exist due to natural and forced convection (exhaust) and conduction processes. In the production space, the exhaust $Q_F$ may be the greatest source. Transfer air and natural convection and conduction may transfer enthalpy as indicated at 582 between the spaces 143 and 153.

Each process may involve a substantial delay as indicated by the respective delay symbols (505, typ.). Also, each roof top unit 510 and 505 has internal delays, for example, the time between startup and steady state heating or cooling, characteristics that are well understood by those of skill in the art. A model may be employed in many different ways to control a system such as discussed in the present application. In a preferred embodiment, outdoor weather predictions for temperature, humidity, wind, etc. are combined with predictions for occupancy, production orders (which may in turn be used to predict the amount of heat and fume loads generated), to "run" the model and thereby predict a temporal operational profile in discrete time. From such a profile, the total energy consumed, the duty cycle of equipment, the number and gravity of off-design conditions (e.g. indoor pollution due to exhaust hood breach) may be derived over a future period of time.

To make the predictions of the model useful for control, the model may be used to "test" several possible operational sequences over a future period of time to determine which is best. However, like a chess game, each moment in the future may provide a new opportunity to branch to a new operational sequence. An example of an operational sequence, as discussed above, is to use a dining room rooftop unit to satisfy the load in a kitchen by bringing the dining room unit online and transferring air to a kitchen prior to opening the dining room to the public. Other constraints may be imposed such as limiting the flow of exhaust to low predetermined idle level and the model run through a simulation run. This may be done for multiple starting times. In addition to multiple starting times, the different sequences may be characterized by substantially different operating modes such as, instead of starting the dining room rooftop unit and providing transfer air, kitchen and dining room units may be run simultaneously or sequentially with respective start times.

Of course, the simulation need not be so detailed as to actually model the dynamic performance of the systems in discrete time since most processes can be represented in a lump parameter fashion. For example, the dynamic energy efficiency ratio of an air conditioning unit may be represented in the model as a function of duty cycle which can be derived from an instant load and an instant steady state capacity.

Not all predictive control strategies need be based on a complex dynamical model of an overall system. One relatively simple kind of predictive control can be simply to use occupancy information to change the current mode of the space conditioning equipment to provide more precise tracking of temperature and humidity. Such information can come from such exotic sources as counting individuals in a video scene as mentioned above. An example is where occupancy or activity level can be used to control the exhaust system of a kitchen. The controller may increase exhaust rate in response to increased activity which may be recognized by occupant count in the kitchen, by sound levels, by motion detection, etc. This would "anticipate" and thereby better control exhaust to prevent escape of effluent from an exhaust hood. Note that occupancy or activity may be inferred from time of day and day of week data or from networked equipment, for example, by the count of check-ins at a register used for tracking patrons and assigning waiters at a restaurant.

What is proposed is that each operational sequence represent a system state trajectory to be tested with at least some of the details of an operational sequence being specified by the trajectory. For example, implicit within the sequence discussed as an example where the kitchen load is satisfied by the dining room rooftop unit and transfer air, there may be a control process by which any additional make-up air required is satisfied by a separate kitchen make-up air unit. Within each trajectory, many such local or global control processes may be defined.

What is claimed is:

1. A method of controlling air conditioning units of a restaurant, comprising:

satisfying a space conditioning load in a kitchen by running a dining room air conditioning unit and transferring air to a kitchen prior to opening the dining room to the public;

at least another time, operating kitchen and dining room air conditioning units simultaneously or sequentially with respective start times; and during a time prior to opening the dining room to the public, activating at least one exhaust hood to run in an idle level that limits the amount of exhaust flow below a predetermined level.

2. The method of claim 1, further comprising operating the dining room and kitchen air conditioning units sequentially responsively simulating several possible operational sequences and determining at least one of the total energy consumed and the duty cycle of equipment over a future period of time.

* * * * *